United States Patent [19]
Flanders

[11] 3,952,182
[45] Apr. 20, 1976

[54] INSTANTANEOUS ELECTRIC FLUID HEATER

[76] Inventor: Robert D. Flanders, 18040 Lower Boones Ferry Road, Tigard, Oreg. 97223

[22] Filed: Jan. 25, 1974

[21] Appl. No.: 436,436

[52] U.S. Cl. .............................. 219/309; 219/307; 219/331; 219/381; 219/486; 219/501; 338/269; 307/118
[51] Int. Cl.² ...................... H05B 1/02; H05B 3/78; F24H 1/10
[58] Field of Search ................................................. 219/296–309, 381–382, 319, 335, 336–338, 327–331, 523, 341, 374–376, 310–316, 318, 486, 487, 501; 338/269; 117/231; 73/204; 317/DIG. 3; 340/239 R; 307/118

[56] References Cited
UNITED STATES PATENTS

| | | | |
|---|---|---|---|
| 483,758 | 10/1892 | Appleyard | 219/306 UX |
| 853,892 | 5/1907 | Miles | 219/314 X |
| 879,498 | 2/1908 | Shoenberg | 219/308 |
| 1,104,054 | 7/1914 | Linder | 117/231 X |
| 1,214,757 | 2/1917 | Clark | 219/298 X |
| 2,347,122 | 4/1944 | Peet | 219/309 |
| 2,700,505 | 1/1955 | Jackson | 219/341 X |
| 2,727,979 | 12/1955 | Altosaar | 219/319 |
| 2,843,717 | 7/1958 | Tracy | 219/296 X |
| 3,261,963 | 7/1966 | Weinstein | 219/321 X |
| 3,417,230 | 12/1968 | Millikan | 219/523 X |
| 3,517,162 | 6/1970 | Webb | 219/308 X |
| 3,586,869 | 6/1971 | Kompelien | 219/486 UX |
| 3,770,938 | 11/1973 | Agarate | 219/331 X |
| 3,781,839 | 12/1973 | Bodge | 73/204 X |
| 3,795,789 | 3/1974 | Malzoni et al. | 219/307 X |

FOREIGN PATENTS OR APPLICATIONS

| | | | |
|---|---|---|---|
| 1,029,503 | 3/1953 | France | 338/269 |
| 1,565,134 | 1/1970 | Germany | 219/331 |
| 1,806,722 | 5/1970 | Germany | 219/307 |
| 983,948 | 2/1965 | United Kingdom | 219/306 |

Primary Examiner—A. Bartis
Attorney, Agent, or Firm—Chernoff & Vilhauer

[57] ABSTRACT

A miniature electric fluid immersion heater adapted for instantaneously heating relatively small bodies or flow increments of fluid to a predetermined temperature. The heater is particularly adaptable to be mounted immediately in advance of a hot water faucet in a home or building so as to provide a continuous flow of instantaneously heated water and thereby eliminate the standard hot water heater and the entire hot water piping system in the building. The heater comprises a small, cylindrical, thermally insulated pressure vessel having a fluid inlet and outlet as opposite ends. A series of individually actuated electrical heating elements are positioned within the vessel so as to be in intimate physical contact with the flowing fluid. The heating elements are constructed of a heavy gauge resistance element which is thinly coated with a glass or ceramic frit fused into an impervious, chemically resistant, electrically non-conductive coating having negligible thermal insulation and heat storage capabilities. The wire and coating preferably have matched thermal expansion characteristics so as to minimize stress on the coating. A control circuit for selectively activating the individual heating elements delivers electrical energy automatically responsive to demand. A flow sensor prevents the activation of the majority of the heating elements unless there is a flow of fluid through the heater. When a flow is present, the amount of electrical energy transferred to the fluid as it flows through the heater is controlled by automatic separate activation of the respective elements within the heater, the number of activated elements and their periods of activation being just sufficient to maintain a predetermined fluid temperature at the heater outlet.

22 Claims, 18 Drawing Figures

INSTANTANEOUS ELECTRIC FLUID HEATER

BACKGROUND OF THE INVENTION

This invention relates to an electric heater for instantaneously heating fluids, particularly flowing fluids such as water. The heater incorporates unique immersion heating elements for rapidly transferring electrical energy from the element to the fluid and a special demand-responsive circuit for automatically controlling the electrical power delivered to the elements. The invention additionally relates to the employment of such a liquid heater in homes and commercial buildings as a replacement for the conventional hot water heaters and piping systems normally employed.

The universally used method of transferring electrical energy from an electrical heating element to a fluid is by means of a "Calrod" type unit exposed to or immersed in the fluid. This type of unit comprises a resistance wire surrounded by powered refractory material, all encased in a metal pipe or sheath which is swaged or reduced in diameter to compress the powdered refractory around the resistance wire thereby electrically insulating the wire from the surrounding metal sheath and also from the fluid in which the element is to be immersed. Such elements are economical to employ when gradual heating of a fluid is desired but, because their abundant electrical insulation also provides excessive thermal insulation around the resistance wire, they are costly and unsatisfactory, if the objective is to transfer large quantites of electrical energy instantaneously to a body fluid in order to heat it rapidly. Moreover the heat produced from Calrod elements is not quickly responsive to variations in energy input because their substantial outer shielding possesses too much heat storage capacity and such elements are therefore not suitable for precise temperature control of small bodies or increments of fluid, particularly under variable demand conditions.

In view of the fact that Calrod units have been the only economically feasible elements available for electrically heating water in homes and buildings, and because of the foregoing limitations of such elements, electrical water heating systems presently in domestic use universally feature a central water heater having a large capacity reservoir connected to various water faucets in the building by extensive hot water piping. The central water heater gradually heats and then maintains the reservoir liquid at a predetermined temperature available for use. Unfortunately such conventional hot water heating systems suffer from numerous deficiencies, among them the cold water "delay" which occurs when the hot water faucet is first turned on until the water from the central heater reservoir can arrive at the faucet through the piping. Such delay wastes water and causes increased load on the sewage system. In addition, reservoir-type hot water heaters are limited in their capacity and, once their hot water supply has been exhausted, there is a considerable waiting period until more hot water is available. Moreover standard water heater systems require relatively large amounts of electrical energy because the heating elements must constantly make up for heat losses from the reservoir and the piping, requiring the elements to operate several hours a day even though the actual period of hot water use is considerably less. Such extended operating time also shortens the heater's useful service life, requiring relatively frequent replacement. Finally, the installation of the hot water piping adds substantially expense to the initial cost of building a home or building, and the central heater requires space which might better be used for other purposes.

Accordingly a great need presently exists for an economical electrical heating element capable of rapidly transferring large amounts of electrical energy to small bodies or flow increments of fluid, particularly water, and capable of extremely fast response to energy demands so as to enable the construction of an instantaneous liquid heater of the continuous-flow type adaptable to replace the standard reservoir-type hot water systems presently used in homes and buildings.

SUMMARY OF THE PRESENT INVENTION

The present invention is directed to a unique electrical immersion heating element of the type described adapted for rapidly transferring large quantities of electrical energy to fluids, particularly liquids such as water, so as to instantaneously heat small volumes or flow increments of such fluids. The heating element comprises a resistance element formed in a helical, flat, formed or other configuration suited to the particular application, such resistance element being thinly coated with a refractory material such as a fused glass or ceramic frit forming a fluid-impervious, chemically resistant and electrically non-conductive coating having negligible thermal insulating and heat storage capabilities. In the preferred embodiment such heating element is incorporated in a miniature continuous-flow fluid heater especially adapted for installation immediately adjacent the hot water faucet in a home or building so as to furnish an immediate and continuous stream of hot water at a predetermined temperature without the need for a conventional central hot water heater and its related hot water piping system. Such miniature, continuous-flow fluid heater comprises a small pressure vessel of elongate shape having a fluid inlet and outlet at opposite ends thereof and preferably having multiple groups of the aforementioned heating elements mounted therein. Each group of elements is independently actuated by an automatic control circuit responsive to a flow sensor which prevents actuation of all but one of the element groups unless there is a demand for fluid instituted by turning on the hot water faucet.

During periods of no demand, only a small segment of the heating elements are permitted to operate at all, and these only for sufficient intermittent periods necessary to maintain the small volume of water in the vessel within a predetermined desired temperature range. When a demand occurs, the element groups are sequentially activated until the number of activated groups is just sufficient to maintain the fluid at a predetermined temperature at the heater outlet. Thus energy is imparted to the fluid only to the extent necessary to heat the particular volumetric flow demanded by the user to the required temperature. Demand sensing is preferably accomplished by thermistors because of their extremely fast response to changing conditions, permitting corresponding rapid response in the control circuitry and heating elements necessary for accurate fluid temperature control. Such rapid response is enhanced by the aforementioned electrical immersion heating elements which, because of their lack of any substantial thermal insulation or heat storage capacity between the resistance element and the fluid, are capable of transferring large quantities of electrical energy instantaneously to the fluid upon demand and, just as rapidly, interrupting the transfer of energy in response to the absence or lessening of demand.

Because of the negligible thermal insulation and heat storage surrounding the resistance elements of the present invention, such elements may operate at a relatively low temperature, i.e. no more than 50°–100° F. higher than the fluid temperature, whereas the resistance elements inside Calrod units must operate in the area of 600°–700° F. higher than the fluid temperature. Accordingly, in the water heater embodiment where maximum desired water temperature would probably not exceed 180° F., such heating elements will operate through a maximum start-up temperature differential of no more than approximately 240° F. (i.e. between a minimum incoming water temperature of 40° F. and 280° F.).

After initial start-up, fluid temperature in the heater reservoir rises quickly to the desired predetermined temperature level (i.e., 140°–150° F. residential, 180° F. commercial) and is thereafter constantly maintained within approximately 10° F. of that level whether or not flow is demanded, unless the unit is shut down or flow demand exceeds heater capacity. Thus the operating temperature range of the resistance elements is no more than about 50°–100° F., thereby minimizing the stress effects of thermal expansion and contraction and preventing cracking of the coating.

Furthermore, it is possible substantially to match the thermal expansion characteristics of the inner resistance element with those of the thin glass or ceramic coating over the aforementioned small maximum temperature differential of the element so as to avoid any undue stress with resultant cracking of the coating. The capability to avoid cracking is further enhanced by the fact that, during operation, the heating elements are "cooled" due to their immersion in the heated fluid thereby slowing the time rate of their temperature fluctuation and eliminating thermal shock.

In effect, therefore, it is the unique thin protective coating having negligible thermal insulating and heat storage qualities but yet excellent electrical and fluid insulating qualities which permits the heating elements to operate over a relatively small temperature range, while conversely it is the aforesaid small temperature range which permits the use of such minimal coating without chance of structural failure.

The development of the rapid response heating element of the present invention enables the employment of a uniquely small, continuous-flow fluid heater adapted to replace the standard reservoir-type central hot water heater and associated piping systems presently in use in homes and buildings. Such miniature continuous-flow water heater has all of the features necessary to overcome the deficiencies of present hot water heating systems, including the absence of any need for the installation of extensive hot water piping in the building, no special space requirements, no cold water delay, unlimited capacity at normal flow rates, and little or no heat loss thereby requiring less energy and enabling longer service life.

An additional important application of the continuous-flow fluid heater is in space heating for homes and commercial buildings. The ability of the heater to furnish an inexhaustible supply of hot water makes the heater well adapted to furnish the water through thermostatically controlled pump means or valve means to a series of convection-type space heater units located at the usual baseboard locations in the building. This enables the economical combination of water heating and space heating functions in a single efficient system and obviates the need for separate space-heating systems.

Accordingly it is a principal objective of the present invention to provide a unique, rapidly responsive electrical element for instantaneously heating relatively small bodies or flow increments of fluid, particularly water to a predetermined temperature.

It is a further principal objective of the present invention to provide a miniature continuous-flow fluid heater adapted to replace the standard reservoir-type hot water heater and associated piping systems presently utilized and thereby overcome their deficiencies.

It is a further important objective of the present invention to incorporate such fluid heater in a space-heating system for homes and commercial buildings so as to obviate the need for other types of space heating systems.

The foregoing and other objectives, features and advantages of the present invention will be more readily understood upon consideration of the following detailed description of the invention taken in conjunction with the accompanying drawings.

DESCRIPTION OF THE PREFERRED EMBODIMENT

The preferred embodiment in which the heating element of the present invention is employed is a miniature continuous-flow electric water heater. It should be understood that such water heater is not the only application in which the heating element may be employed, since fluids other than water such as oils, fats, greases, gases, etc. and other substances can also be quickly heated by the element, and equipment other than a continuous-flow heater, such as cookware for example, may utilize the heating element.

Figure 1:
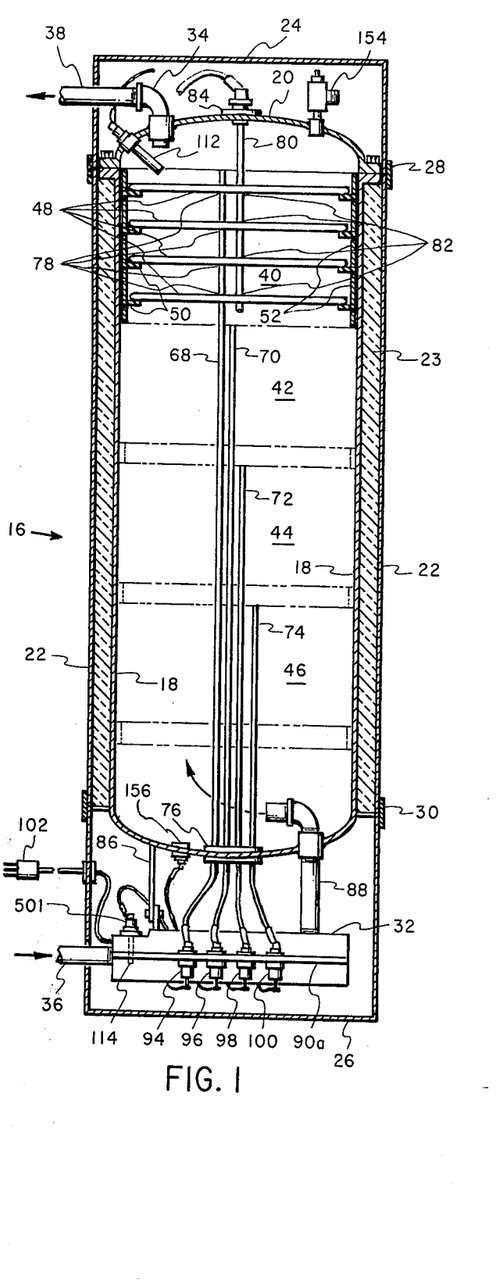
FIG. 1 is a partially sectional side view of an illustrative embodiment of a miniature continuous-flow electric fluid heater embodying the principles of the present invention.

One embodiment of the heater is designated generally as 16 in FIG. 1 and comprises an elongate, cylindrically shaped pressure vessel 18 generally constructed of stainless steel or glass frit-lined metal with a removable closure head such as 20 at one or both ends. The preferred vessel size is approximately 8–9 inches in diameter by 16–30 inches long. The vessel 18 is enclosed within a thin-wall jacket 22 similar in appearance to that of a standard reservoir-type water heater and is surrounded by thermal insulation 23 to prevent too much heat from reaching the external surface of the unit. Respective caps 24 and 26 at either end of the jacket 22 are removably secured thereto by bands 28, 30 or other conventional fastening means so as to permit easy servicing of internal components at either end of the unit. A water inlet assembly 32 is provided at one end of the heater adaptable to conduct cold water into the interior of the vessel 18, and an outlet assembly 34 for discharging hot water is provided at the other end.

The heater is small enough in size to be installed directly below or immediately adjacent to the lavatory in the normal bathroom or under the sink in the kitchen. To install the heater, the inlet assembly 32 is connected by a pipe 36 with a standard Tee fitting (not shown) inserted in the incoming cold water line so that cold water may be supplied both to the heater 16 and to the cold water faucet in the same area served by the heater. The outlet 34 is connected by a short length of pipe 38 to the hot water faucet. In the normal house, apartment or mobile home having a single bath and kitchen, one heater is preferably installed at each location eliminating the necessity of connecting hot water piping between the two areas. Where homes or other facilities have more than one bathroom, a heater having a larger capacity can be installed to handle both bathrooms or, alternatively, one heater per location can be used. In the case of motel or hotel installations, one slightly larger capacity unit may be installed to serve adjacent bathrooms. In all cases, except for the short length of pipe joining the heater outlet to the hot water faucet (probably a maximum of three or four feet in most cases) only cold water plumbing is required throughout the building. The heater need not necessarily be connected to a manually controllable hot water faucet but may, if desired, be coupled to virtually any apparatus which requires a flow of hot water, the size of the heater being dependent upon the volumetric flow and temperature demands of the apparatus.

Figure 3:
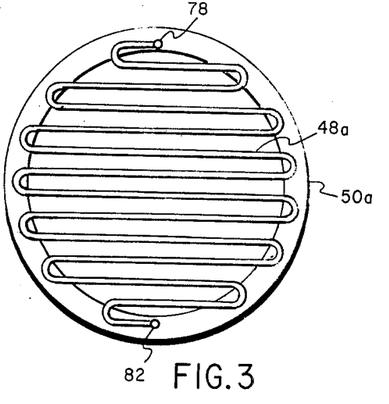
FIG. 3 is a front view of an embodiment of a coiled heating element which may be utilized in the water heater of FIG. 1.
Figure 4:
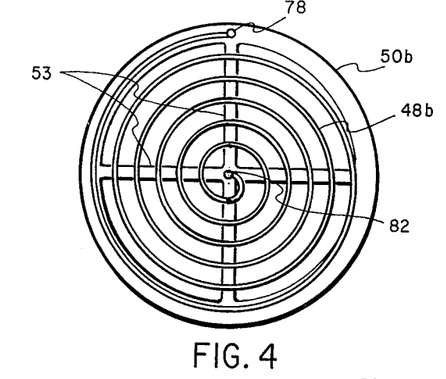
FIG. 4 is a front view of an alternative helical embodiment of such heating element.
Figure 5:
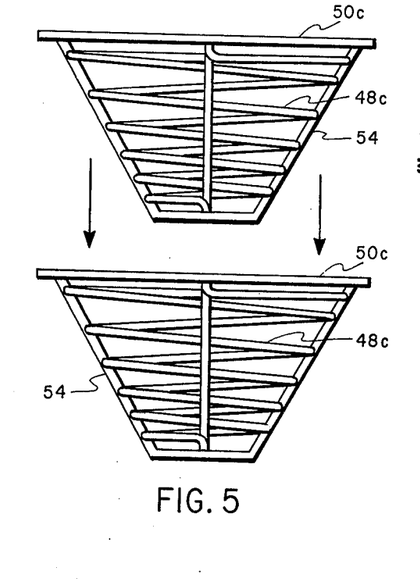
FIG. 5 is an exploded side view of a pair of nestable helical heating element consituting still another alternative embodiment.

Inside the pressure vessel 18 are mounted multiple groups of electrical resistance heating elements, such groups being designated generally as 40, 42, 44 and 46 respectively. Although four such groups are shown, more or less groups might be utilized in a particular heater depending upon power requirements. Each group may consist of a plurality of coiled heating elements designated generally as 48 in FIG. 1, each element being mounted transversely to the longitudinal axis of the heater 16. (Only the heating elements of group 40 are illustrated for simplicity, it being understood that the other groups are of the same construction.) The coils 48 are mechanically fixed in place within the vessel 18 by ceramic or glass coated electrically insulating support rings such as 50, which are in turn held within the vessel by a series of spacer rings 52 which locate the coils in relation to the vessel and to one another. The coils 48 may be in any of several configurations. For example FIG. 3 shows a heating element coil 48a having multiple horizontal portions affixed at each end to a support ring 50a so as to mechanically restrain the portions of the coil from excessive movement. Such restraining helps to minimize stress and prevent cracking of the heating element protective coating to be described hereafter. FIG. 4 shows a flat helical coil 48b fastened to a support ring 50b having integral cross pieces 53 to which are fastened the individual convolutions of the coil, again for restraining purposes. FIG. 5 shows a pair of conically wound nestable helical coils 48c mounted on respective support rings 50c with the individual convolutions of each element being supported by a frame 54 comprising part of the support ring 50c. In each of the embodiments of FIGS. 3–5, the coils may be firmly attached to the respective insulating support rings by any suitable means, for example by a temperature-resistant, waterproof adhesive or by means of conventional mechanical fasteners.

Figure 6:
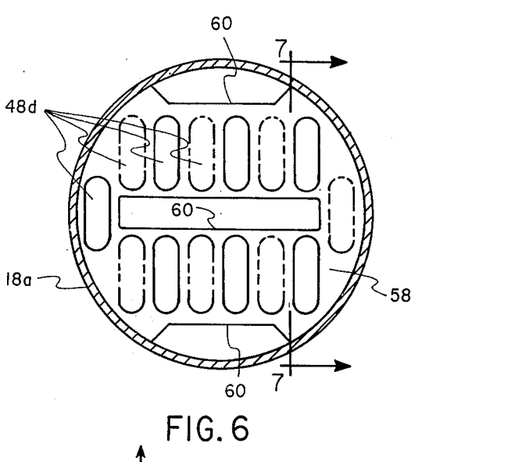
FIG. 6 is a simplified, partially sectional top view of an alternative heater featuring "hairpin" heating elements nesting interstitially with one another.
Figure 7:
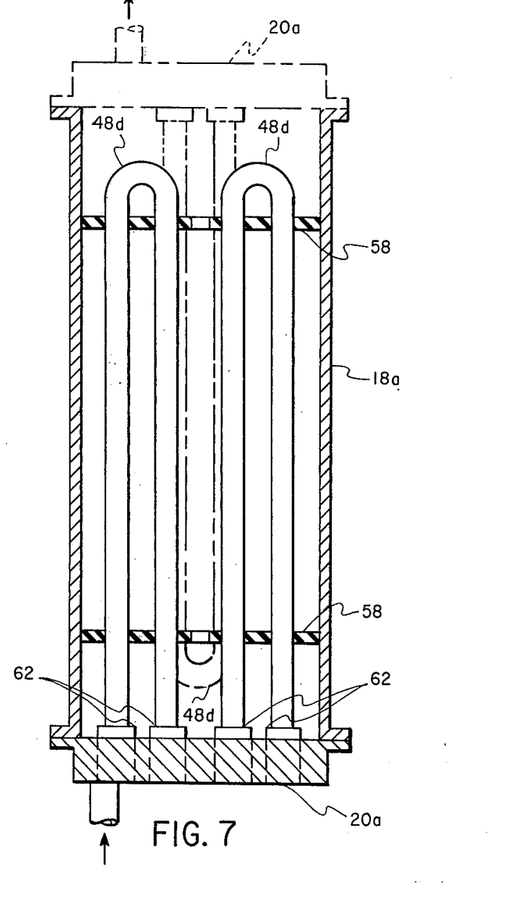
FIG. 7 is a sectional view taken along line 7—7 of FIG. 6.

A further alternative heating element configuration is illustrated in FIGS. 6 and 7 comprising a series of hairpin-shaped elements 48d extending inwardly toward one another from the respective opposite closure heads 20a of a pressure vessel 18a. The elements protruding from the bottom closure head are shown in solid lines and nest interstitially with those protruding from the top which are shown in phantom. The various elements 48d are likewise divided into multiple groups by appropriate electrical connections in the manner to be described hereafter in detail. A pair of electrically insulating support members 58 containing elongate apertures for snuggly fitting around the hairpin elements 48d are provided adjacent each end of the vessel 18a for mechanically restraining the ends of the elements. Apertures such as 60 are also formed in the support members 58 to permit the passage of water therethrough. The ends of the hairpins protrude through the respective closure heads 20a surrounded by water seals 62 for connection to an electrical power source.

Figures 8, 9:
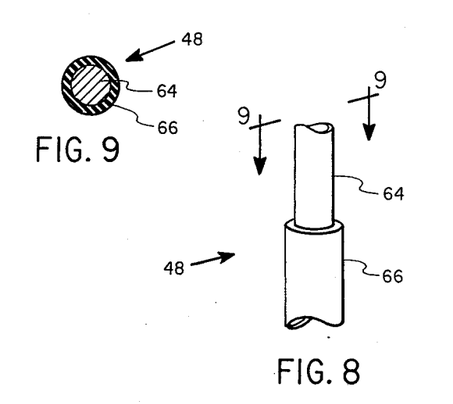
FIG. 8 is a partial perspective detail view of a typical rapid-response heating element incorporating the principles of the present invention.
FIG. 9 is a sectional view of the heating element taken along line 9—9 of FIG. 8.

Regardless of which of the foregoing heating element configurations is employed, the electrical resistance heating elements 48 feature a unique construction designed to transfer large quantities of electrical energy from the elements to the fluid in an extremely short period of time when activated and, conversely to interrupt such transfer very rapidly when deactivated. With reference to FIGS. 8 and 9, a typical rapid-response heating element 48 comprises a heavy gauge resistance element 64 (preferably a wire or strip about 1/16 or 3/32 of an inch in thickness) coated with a thin fused porcelain, glass or ceramic frit having a thickness preferably of from about two to seven thousandths of an inch. While the thickness of the inner resistance element may be quite variable depending on desired power levels, the thickness of the coating should be maintained as thin as possible for quickest response of the element. The coating 66 may comprise fused silica (a highly purified glass), chemically strengthened glass, porcelain or other known thermal shock-resistant refractory materials having high fluid-impervious and electrical insulating capabilities at a minimum thickness so as to minimize the thermal insulation and heat storage capacity of the coating. Such coatings will be referred to collectively hereafter in the specification and claims as "ceramic". The element 48 is constructed by first forming the resistance element 64 in the coil or other configuration desired and then coating the element by dipping, spraying, painting or otherwise coating the entire outer surface with the ceramic frit dispersion. The coating is then fired and thereby fused into a homogeneous unit. The firing process melts the ceramic frit on the outside diameter of the resistance element where the coating fuses to itself and simultaneously bonds to the resistance element, forming a fluid-impervious, chemically resistant, electrically insulating, slick surface to which few chemicals or mineral scales will adhere, the latter feature making the heater virtually self-cleaning.

Because of the relatively intimate contact in all of the foregoing embodiments between the inner resistance element and the surrounding fluid, made possible by the above-described thin coating, the temperature differential between the resistance element and fluid need be on the order of only about 50° to 100° F. higher than the fluid to achieve the high rate of energy transfer needed for rapid-response heating. Since in the preferred embodiment the primary objective is to heat water or similar fluids, the maximum fluid temperature will be predictable (say 180° F. maximum for hot water). Accordingly the temperature of the resistance elements need generally not be in excess of 280° F., and the elements accordingly are designed to a very low watt density of between about 10 and 20 watts per square inch of heating element surface area. Considering that the temperature of the elements when unactivated at start-up would not be less than pipe line temperature (say 40° F.), the maximum temperature fluctuation of the element would not exceed about 240° F. Thus the maximum temperature range of the element and its coating would be of a very low order and thermal expansion and resultant thermal stress on the coating would also be very small. Moreover, since the heating element is essentially water cooled, the small amount of expansion or contraction which may occur takes place over fifteen or twenty seconds which further minimizes the thermal stress on the coating of the element and enables it to withstand a substantially unlimited number of temperature cycles without cracking.

In order to reduce to an absolute minimum the stress on the coating, it is very desirable that the respective thermal expansion coefficients of the coating material and the resistance element (i.e. wire or strip) be substantially matched in the particular maximum temperature range contemplated (e.g. 40°–280° F. for water heating purposes). A sufficient variety of different resistance element alloys and different ceramic materials suitable for the purpose exists that such thermal expansion coefficients can be matched adequately to eliminate any undue stress. By way of example, either of the following two frit dispersions have been found to be satisfactory for coating a Chromel-C resistance wire in accordance with the present invention:

| Ingredient | Percent By Weight |
| --- | --- |
| Resistor tube frit No. 140 (Ferro Corporation, Vernon, California) | 66. |
| Green Label Clay | 0.5 |
| Bentonite | 0.5 |
| Water | 33. |
| Frit No. XT1071 (Ferro Corporation, Vernon, California) | 62. |
| Red Label Clay | 4. |
| Potassium Carbonate | 0.5 |
| Bentonite | 0.25 |
| Sodium Nitrite | 0.125 |
| Gum Tragacanth | 0.063 |
| Water | 33. |

In manufacturing heating elements using either of the above two coatings, the resistance elements are coated with the frit dispersions in the amount of about 70 grams of dispersion per square foot of element surface area, after which the coated elements are fired at approximately 1450° F. or more.

In the water heater embodiment of FIG. 1, electrical energy is sent to the heating elements 48 of the respective groups 40, 42, 44 and 46 separately by respective electrically insulated, fluid-impervious bus bars such as 68, 70, 72 and 74 extending through one or more water seals such as 76 at one end of the vessel 18, each bus bar being connected in parallel to the "power input" junction 78 of each heating element in the particular group 40, 42, 44 and 46 served by the respective bus bar. The power input junctions 78 are also electrically insulated and waterproof. A common return bus bar 80 may be provided extending through a watertight seal 84 at one end of the vessel 18 connected in parallel to the return junctions 82 of all of the elements 48 in the vessel. It will be recognized that the hairpin-shaped heating elements shown in FIGS. 6 and 7 do not require bus bars extending between the interior and exterior of the pressure vessel since both ends of each hairpin element communicate with the exterior of the vessel through the watertight seals 62 and all electrical connections are therefore exterior of the vessel.

Figure 10:
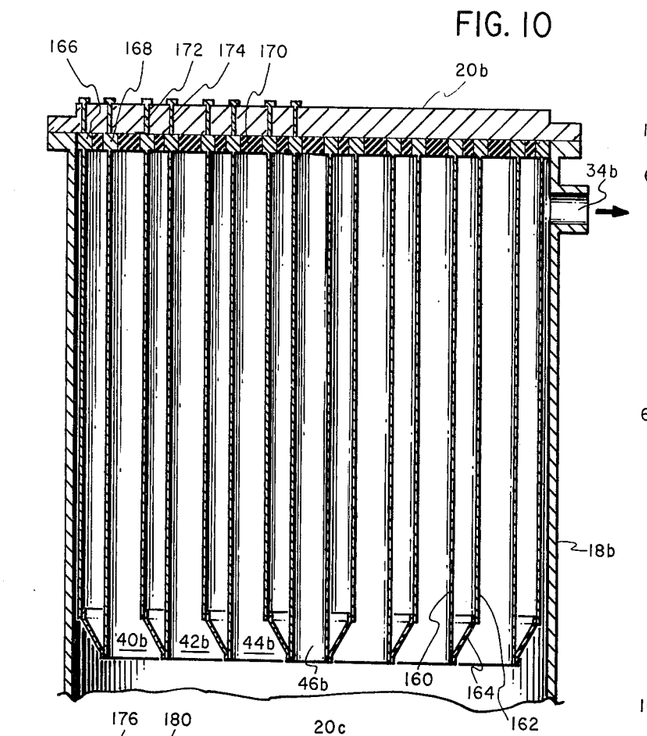
FIG. 10 is a partial, simplified sectional view of an alternative heater featuring concentrically arranged perforated heating elements.
Figure 11:
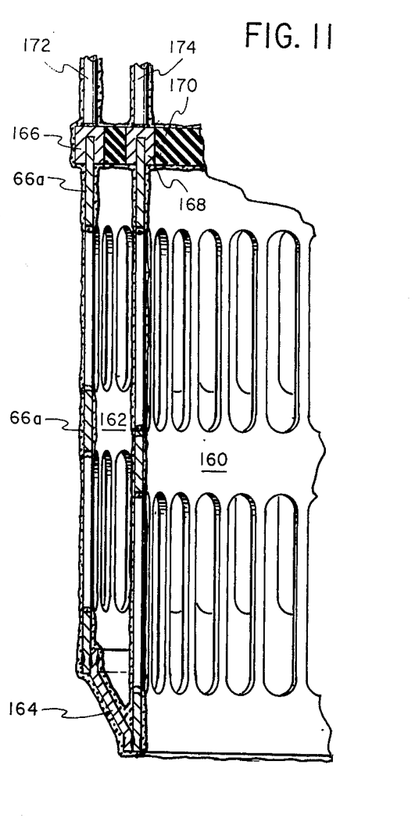
FIG. 11 is a detail view of a single perforated heating element of the type shown in FIG. 10.

Further examples of possible heating element assemblies are shown in FIGS. 10–13. With respect to the exemplary embodiment of FIGS. 10 and 11, a modified pressure vessel 18b has a closure head 20b which mounts all of the heating element groups. Each group 40b, 42b, 44band 46b respectively comprises a cylindrical member having an inner perforated wall 160 and an outer perforated wall 162 for permitting the flow of water therethrough. Each pair of walls is joined together, separated by a space, at one end by an electrically conductive member 164. The opposite end of each wall is mounted in a respective bus bar ring such as 166, 168 mounted in an end plate 170 constructed of an electrically insulating material, such as ceramic, so that the respective bus bars are electrically isolated from one another. Each bus bar ring has a connector such as 172, 174 adapted to extend through the closure head 20b for connection to the electrical control circuit of the heater to be described hereafter. As illustrated in FIG. 10, the respective cylindrical heating element groups 40b, 42b, 44b and 46b are mounted on the end plate 170 in concentric spaced relation with respect to one another. In the manufacture of the heating assembly, all of the elements, connectors and bus bars are preferably fastened together as an assembly and then the entire assembly is dipped in a ceramic frit dispersion thereby forming a thin insulating coating 66a around the entirety of the assembly in the manner previously described. Thereafter the assembly is fastened by any suitable means to the closure head 20b with the connectors extending through the head for attachment to the electrical control circuit. The coating serves to insulate the assembly electrically not only from the fluid but also from the walls and closure head of the pressure vessel 18b. In the foregoing embodiment the hot fluid outlet 34b is preferably through the wall of the pressure vessel 18b rather than through the closure head 20b.

Figure 12:
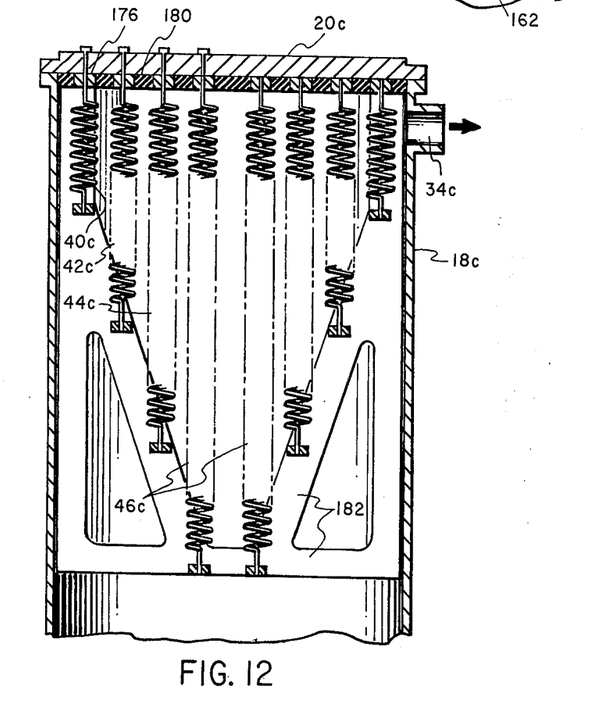
FIG. 12 is a partial, simplified sectional view of a further alternative heater featuring concentrically arranged spring-shaped heating elements.

FIG. 12 illustrates a further alternative heating element arrangement in a pressure vessel 18c. Here the individual heating elements are spring-shaped members forming concentrically arranged groups 40c, 42c, 44c and 46c respectively. At one end of the assembly all of the heating elements are mounted in an electrically insulating end plate 180 which is in turn affixed to the closure head 20c. At the other end the elements are supported by an electrically insulating frame 182 supported within the pressure vessel. Connectors such as 176 are located at each end of the respective spring-shaped elements such that all of the elements of a particular group are connected in series with one another. Assuming that the number of elements in each group is an even number, all electrical connections will emerge from the closure head 20c. The heating elements, end plate 180, frame 182 and connectors 176 are preferably all fastened together and the resultant assembly dipped in a ceramic frit dispersion, fired and mounted in a manner similar to that previously described with respect to FIG. 10.

Because there are necessarily fewer spring-shaped elements in the inner concentric groups than in the outer groups of FIG. 12, the elements of the inner groups are progressively longer than the elements of the outer groups so that the total length of the series-connected elements in each group is the same, thereby providing each heating element group with an equal resistance and an equal watt density. The equal watt density is particularly important because the watt density of all resistance elements, regardless of their specific configuration, should be exceptionally low as stated previously so as to achieve a low temperature differential (i.e. 50°-100° F.) between the resistance element and the fluid and thereby minimize the stress on the coating due to thermal expansion. (In FIG. 10 equal watt density of the respective parallel elements in each double-walled cylindrical groups is achieved by making all such elements the same length. However the resistance of the outer cylindrical groups will be less and thus their power output greater than that of the inner groups unless the perforations in the outer groups are progressively enlarged so that the total cross-sectional resistance area of all of the groups is the same).

Figure 13:
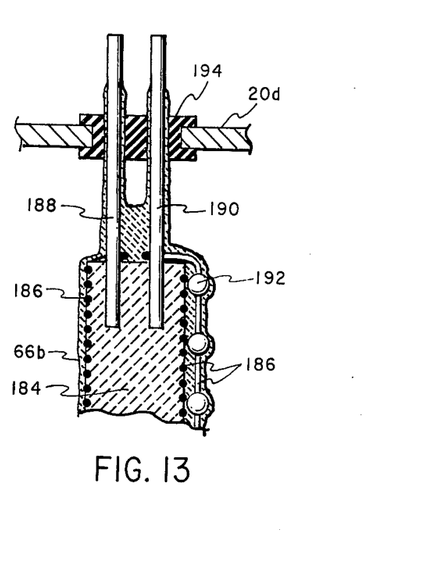
FIG. 13 is a partial sectional view of an alternative form of heating element which could be used in place of the spring-shaped heating elements of FIG. 12.

A heating element which might be used in place of the spring-shaped elements of FIG. 12 is shown in FIG. 13. Such element comprises a ceramic core 184 having spiral grooves formed in its surface so as to permit a resistance wire 186 to be wound thereon. One end of the wire 186 is attached to an electrical connector 188 mounted in the core while the opposite end of the wire extends from the opposite end of the core along the outside of the winding and attaches to a second connector 190. Ceramic beads 192 are distributed along the portion of the wire outside of the winding so as to insulate the return wire from the remainder of the winding. The entire assembly is dipped in a ceramic frit dispersion so as to form a thin coating 66b as previously described, and the connectors may then be mounted in a closure head 20d by means of electrically insulating water seals 194. All electrical couplings are made exterior of the closure head 20d by means of the protruding connectors 188, 190. This embodiment has several advantages over the spring-shaped elements of FIG. 12 in that no electrical connections inside the pressure vessel are required and each heating element may be easily removed and replaced separately in case of failure. The elements may be of varying length with those of each group being electrically connected in series as in the embodiment of FIG. 12, or alternatively the elements may be of the same length with those of each group being connected in parallel. In the latter case the total resistance of each group would depend on the number of elements in each group, and the resepective group resistances could be made either equal or unequal as desired for optimum performance.

All of the water heater embodiments operate essentially in the same way and have the same basic structure with respect to features other than the heating element configurations just discussed. Accordingly the remainder of this description will be directed to the detailed embodiment of FIG. 1 and the control circuit of FIG. 14, both of which will be understood as being typical.

Figure 2:
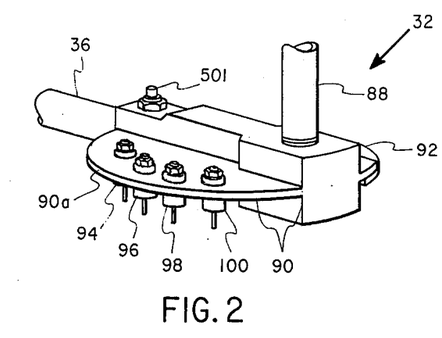
FIG. 2 is a perspective view of a mounting member for supporting the heater control circuit.

The water inlet assembly 32 is mounted to the inlet end of the vessel 18 by means of a bracket 86 and pipe 88 through which the incoming cold water enters the vessel. As best seen in FIG. 2, the inlet assembly 32 comprises a machined metal portion 90 which an electrically non-conductive linen-reinforced phenolic plate 92 is mechanically attached. The phenolic plate 92 mounts and insulates the various electrical circuit elements which control the actuation of the heater 16 to be described in detail hereafter. The metal portion 90 of the inlet assembly 32 has an internal conduit (not shown) formed therein which allows the incoming cold water to flow from pipe 36 to pipe 88. The metal portion 90 also includes an integral plate 90a in which are mounted solid state AC circuit contactors 94, 96, 98 and 100 which control the supply of electrical energy to the respective heating element groups 40, 42, 44 and 46. The circuit contactors are preferably high-capacity thyristor triacs which, under normal operation, generate a considerable amount of heat. The mounting of the triacs in the plate 90a permits the heat generated by the triacs to be conducted through the metal portion 90 of the inlet assembly 32 to the stream of incoming cold fluid thereby transferring the heat from the triacs to the fluid and allowing the triacs to operate in a cool direction.

Figure 14:
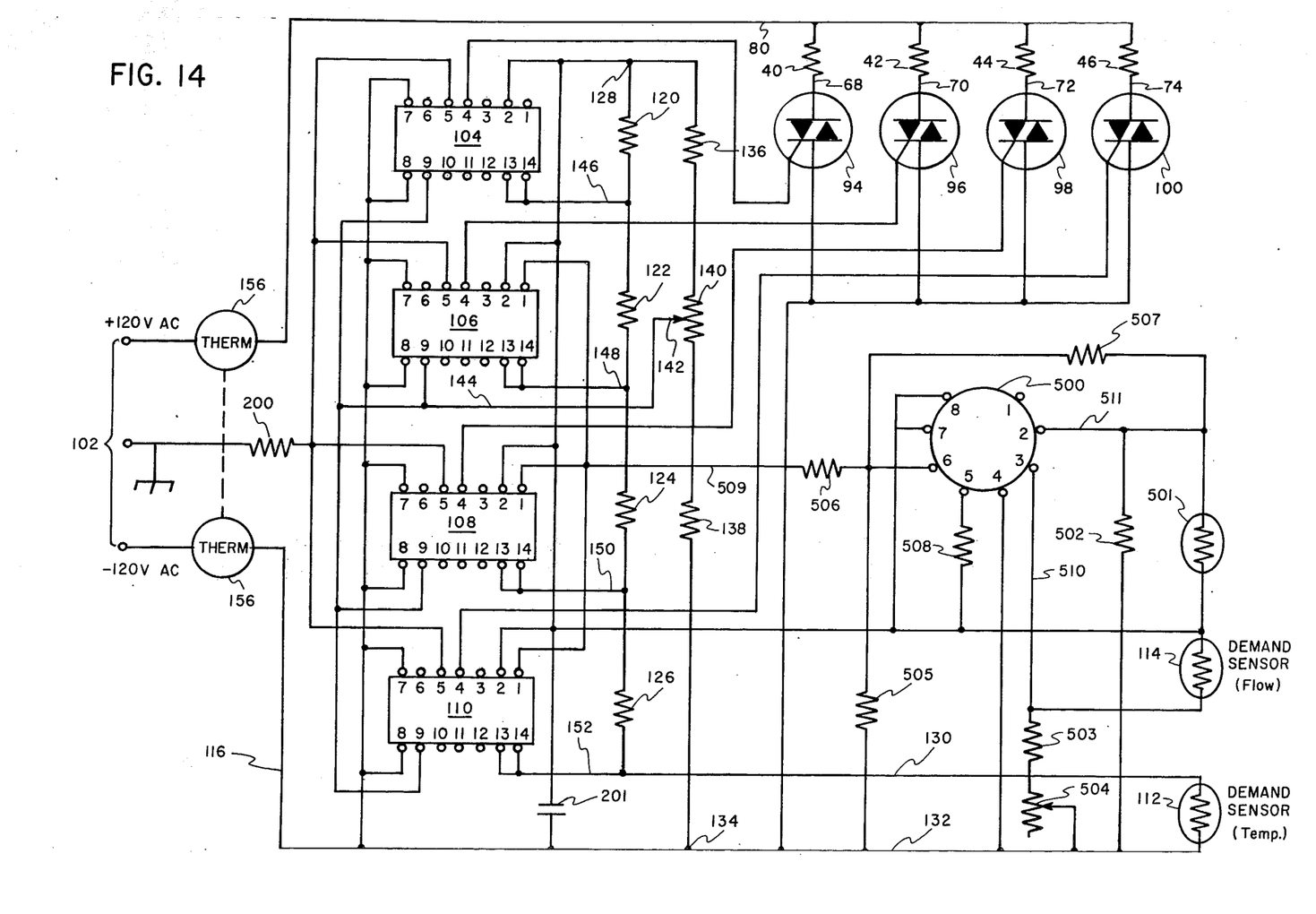
FIG. 14 is a schematic diagram of the demand-responsive power control circuit of the fluid heater.

FIG. 14 depicts schematically the solid state demand-responsive automatic control circuit for actuating the heating element groups of the heater 16. Input power is provided by an appropriate connector 102 coupled with the main power panel of the home or building so as to utilize 220-240 volts of single phase power at 50–60 Hertz. In the preferred water heater embodiment, the maximum input current is 100 amps so that the circuit is designed for regulating up to 24,000 watts of electrical power. The primary components of the circuit include the different heating element groups 40, 42, 44 and 46, the power-controlling triacs 94, 96, 98 and 100, integrated circuit zero-voltage switch modules 104, 106, 108 and 110 and thermistor demand sensors 112 and 114 respectively. The capacity of the circuit and resistance elements is preferably sufficient to heat water through at least a 100° F. rise at a flow rate from zero to at least 90 gallons per hour for normal domestic use.

Figure 15:
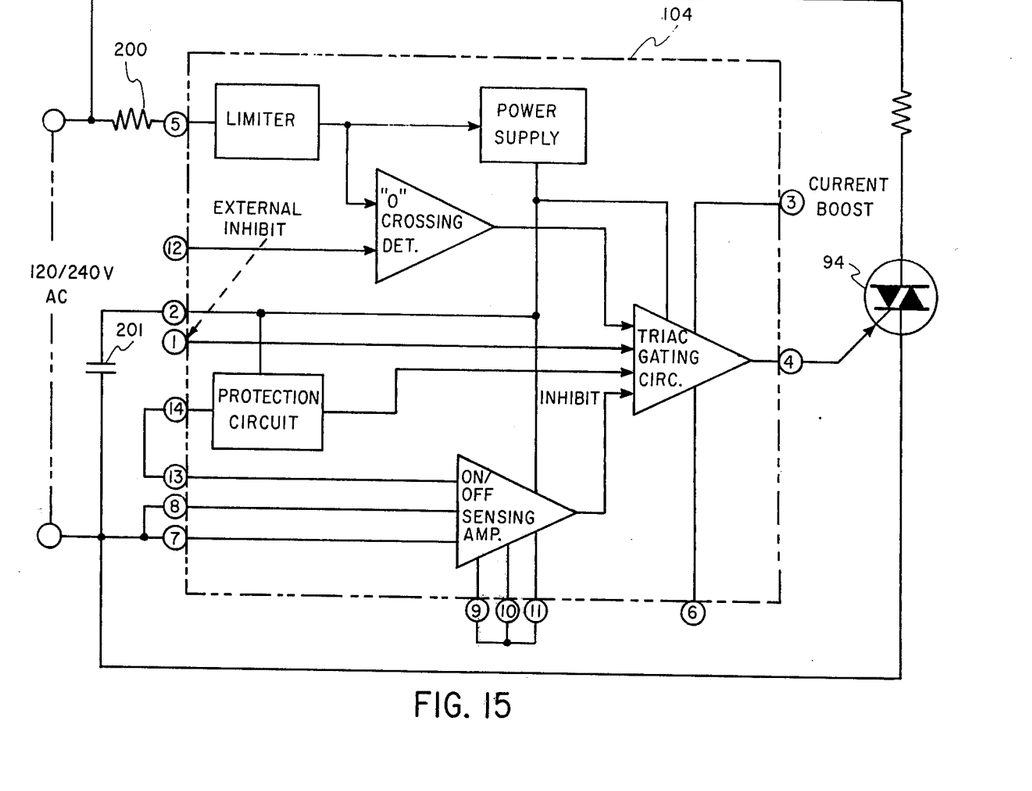
FIG. 15 is a functional block diagram of the integrated circuit zero-voltage switch utilized in the control circuit of FIG. 14.
Figure 16:
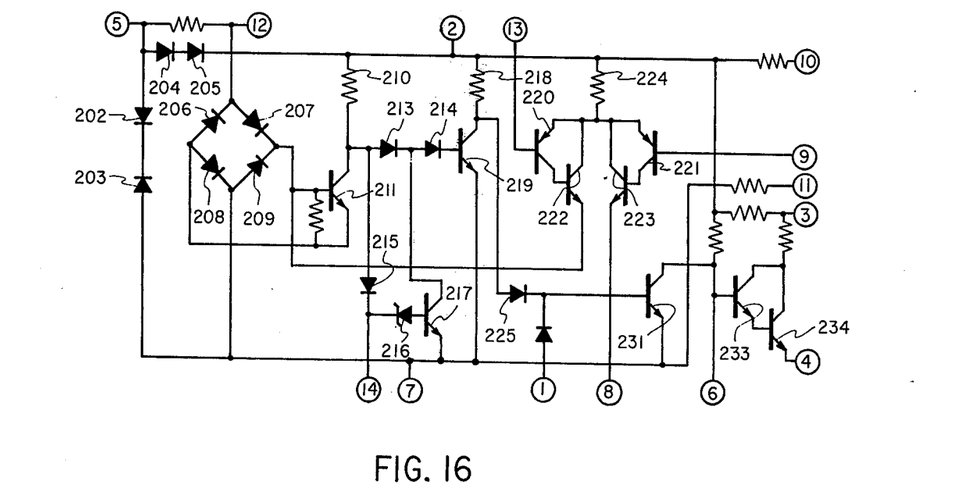
FIG. 16 is a schematic diagram of the zero-voltage switch.

A basic feature of the control circuit of FIG. 14 is that the triacs which control the supply of electrical current to the respective heating elements are each turned on or off in response to demand by a respective integrated circuit switch module. Although the switch module constitutes a standard component (RCA part number CA3059), readily available on the market along with similar types of other manufacturers, its internal function and structure is important enough to warrant description. The text of the following three paragraphs describing typical switch module 104, and FIGS. 15 and 16, is substantially taken from an RCA publication entitled "Appendix — Functional Description of the RCA CA3059 Integrated Circuit Zero Voltage Switch", although figure and component identifying numbers have been changed.

Switch module 104 is a monolithic silicon integrated circuit designed to control a thyristor triac such as 94 in a variety of AC power switching applications. In the following discussion all voltages are referred to terminal 7. Power to the circuit is derived directly from the AC line, as shown in FIG. 15. In operation a dropping resistor 200 is required to limit the current in an individual module. The diodes 202 and 203 in FIG. 16 form a symetrical clamp that limits the voltages on the chip to 8 volts. Diodes 204 and 205 form a half-wave rectifier that develops a positive voltage on the external storage capacitor 201. The functions of the blocks in FIG. 15 can be best understood by consideration of the normal state of the triac gating circuit in its "on" state, during which current is being delivered to the triac gate terminal 4. The other circuit blocks inhibit the gating circuit unless certain conditions are met. In the "on" state, transistors 233 and 234 (FIG. 16) are conducting, 231 is off and 219 is on. Any action that turns transistor 231 on removes the drive from 233 and allows the triac to turn off. Transistor 231 may be turned on directly by application of a minimum of +1.2 volts at 10 microamperes to the "external inhibit" terminal 1. Diode 225 isolates the base of transistor 231 from other signals when an external inhibit signal is applied so that this signal is the highest priority command for normal operation. Transistor 231 may also be activated by turning off transistor 219 to allow current to flow from the power supply through resistor 218 and diode 225 into the base. Transistor 219 is normally held on by current flowing into its base through resistor 210 and diodes 213 and 214 when transistor 211 is off.

Transistor 211 is a portion of the zero-crossing detector. When the voltage at terminal 5 is greater than about +3 volts, current can flow through resistor 201, diode 207, the base-to-emitter junction of transistor 211, and diode 208 to terminal 7 to turn on transistor 211 and inhibit the pulse. For negative voltages with magnitudes greater than about 3 volts, the current flows through diode 209, the emitter-to-base junction of transistor 211, diode 206, and resistor 201, and again turns on transistor 211. Transistor 211 is off only when the voltage at terminal 5 is less than the threshold voltage of approximately 2 volts. Therefore output current at terminal 4 occurs in a narrow pulse which is approximately centered about the "zero voltage" time in the cycle. As long as such pulses are not inhibited, the triac remains in its conducting mode from the time when a first pulse is delivered until the first "zero voltage" time when such pulse is absent.

The discussion thus far has considered only cases in which pulses are present all the time or not at all. The differential sense amplifier consisting of transistors 220, 221, 222 and 223 makes the switch a flexible power control circuit. The transistor pairs 220–222 and 221–223 form high-beta composite P-N-P transistors in which the emitters of 222 and 223 act as the collectors of the composite devices. These two composite transistors are connected as a differential amplifier with resistor 224 acting as a constant current source. The relative current flow in the two "collectors" is a function of the difference in voltage between the bases of transistors 220 and 221. Therefore, when terminal 13 is more positive than terminal 9, little or no current flows in the "collector" of composite transistor 220–222; when terminal 13 is negative with respect to terminal 9, most of the current flows through the path and none in terminal 8. When current flows in composite transistor 220–222, the path is from the supply through resistor 224, through transistor 220–222, through base-emitter junction of 211, and finally through diode 208 to terminal 7. Therefore when the voltage at terminal 13 is equal to or more negative than the voltage at terminal 9, transistor 211 is on and output is inhibited.

Referring now to the operation of the demand responsive control circuit of FIG. 14, the various groups of heating elements 40, 42, 44 and 46 are each separately controlled by respective power control triacs 94, 96, 98 and 100. Each triac is turned on or off in succession, its conducting or non-conducting mode being dependent upon the electrical signal received from terminal 4 of its respective switch module 104, 106, 108 or 110 in the manner just described. Each switch module derives its input electrical power through terminals 5 and 7. A 6 volt source of electrical power is obtainable from terminal 2 of each switch, and it is this source which provides the power for the various demand sensors and their associated circuits to be described hereafter. One side 116 of the 240 volt power line serves as the common side for all electronic circuitry.

When the hot water faucet served by a particular fluid heater 16 is turned off, there is no flow of fluid through the heater and no demand for electrical heating power. During this period only enough heat need be generated to maintain the small volume of fluid within the heater within a predetermined desired temperature range so that no transient charge of cold fluid will be presented initially to the user. This "idle condition" heating function is accomplished by heating element group 40 in a manner to be described hereafter in response to switch module 104, which is the only switch module whose "external inhibit" terminal 1 has no connection. The "external inhibit" terminals 1 of the remaining switch modules 106, 108 and 110 are controlled by an integrated circuit amplifier module 500 which detects heating demand by means of a thermistor bridge circuit. Two bridge circuit negative temperature coefficient thermistors 114 and 501 are located in the cold water inlet. Thermistor 114 is utilized in the self-heat mode and is positioned by a probe directly in the path of fluid flow. Thermistor 501 is positioned at the base of the probe adjacent thermistor 114, but is shielded from direct impingement of the fluid flow so as to be affected only by incoming fluid temperature variations due to geographic and/or climatic conditions (such as the incoming fluid being warmer in the summer than in the winter). When no fluid is flowing, thermistor 114 heats itself and the surrounding fluid and thereby lowers its resistance in comparison with thermistor 501 so that the bridge circuit is unbalanced between leads 510 and 511. This imbalance drives the amplifier to provide an excess of 1.2 volts through line 509 to actuate the inhibit function of the three switch modules 106, 108 and 110 at their respective terminals 1. When flow is initiated, thermistor 114 is rapidly cooled from its self-heated temperature, and its increasing resistance reverses the bridge circuit balance. The output of the amplifier through line 509 then changes to zero volts, which allow the three switch modules to function uninhibited. Thermistor 501 functions to compensate for the aforesaid variations in the incoming fluid temperature so that the flow sensing function of thermistor 114 operates consistently regardless of changes in environmental conditions. It should be recognized that flow sensors other than a thermistor such as 114 might be utilized for sensing the presence of absence of flow demand, such as for example a conventional pressure differential or mechanical type flow sensing device having a variable electrical resistance responsive to flow. Alternatively a magnetic field could be maintained across the incoming cold water pipe, changes in the strength of such field being proportional to the change of fluid flow within the pipe, and an electronic transducing system responsive to field strength could replace the thermistor 114.

Figure 17:
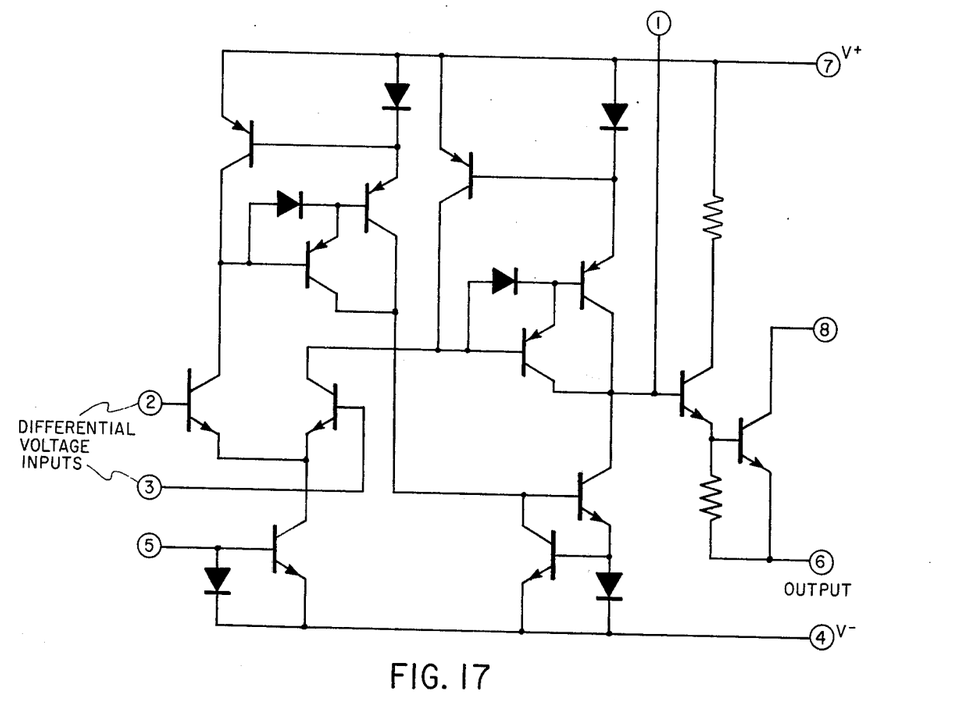
FIG. 17 is a schematic diagram of a differential-input amplifier utilized in the control circuit of FIG. 14 for sensing the presence of heating demand.

FIG. 17 shows a schematic diagram of the amplifier 500. The amplifier features a differential input suitable for the thermistor bridge circuit, and high gain using the single 6 volt power supply. Resistors 502 and 503 are bias resistors which set the proper thermistor current for the bridge circuit, while variable resistor 504 is used for setting proper bridge balance. Resistor 505 provides a constant load for the amplifier while resistor 506 limits the current to the switch modules. Resistor 507 provides stabilizing feedback for the amplifier, while resistor 508 deactivates an auxiliary amplifier input function.

When the foregoing inhibiting function of the flow sensor 114 has been eliminated by the demand for hot water, all of the switches 104, 106, 108 and 110 are free to send current pulses from their respective terminals 4 to their respective triacs to place the triacs in their conducting mode, provided no other inhibiting function is operating. How many of the triacs are thus placed in their conducting mode however depends upon the amount of heating energy needed to heat the particular volumetric fluid flow to the desired temperature range, less energy being required to heat small volumetric flows resulting when the hot water faucet is partially opened than is needed to heat large volumetric flows resulting when the faucet is fully opened. The number of triacs placed in their conducting mode thus depends on the volumetric flow rate of the water and the desired fluid output temperature, such number being controlled by a second thermistor 112 located adjacent the output of the water heater. The thermistor 112 is a negative temperature coefficient resistor which lowers its resistance by an amount dependent upon the degree of heating which it experiences, such heating in turn being dependent on the temperature of the fluid flowing past it. The thermistor 112 is coupled in series with resistors 120, 122, 124 and 126 so as to form one branch of a bridge extending from junction 128 through lines 130 and 132 to junction 134. The opposite parallel branch of the bridge comprises resistors 136, 138 and an adjustable potentiometer 140 extending in series between the same junctions 128 and 134. The adjustable potentiometer 140 is the means by which the predetermined output fluid temperature range of the heater 16 is established, preferably comprising a range of no more than about 10° variably situated between 140° F. and 180° F. depending on the adjustment. The variable output terminal 142 serves as one of the bridge detector outputs and is connected by line 144 with the terminal 9 of each switch module 104, 106, 108 and 110 respectively. The detector output from the other side of the bridge comprises four different staggered voltage taps 146, 148, 150 and 152 each coupled with a terminal 13 of one of the respective switch modules. The two sides of the transducer bridge are thereby coupled with the differential sense amplifiers of the various switch modules such that, when the voltage at terminal 13 of a particular switch module is more positive than at terminal 9, the particular triac controlled by the switch module is in its conducting mode whereas, when the voltage at terminal 13 is equal to or more negative than the voltage at terminal 9, output from terminal 4 is inhibited and the controlled triac is in its non-conducting mode.

When a relatively high flow of hot water is first demanded after the heater has been inactive for some time, requiring four heating element groups to heat the fluid above a predetermined desired temperature, the resistance of the thermistor 112 will rise rapidly due to the sudden charge of cold fluid within the heater such that the voltages at all of the taps 146, 148, 150 and 152 will be more positive than the voltage from tap 142 sensed by terminals 9 of the various switch modules. Accordingly, when the external inhibit function is eliminated due to the cooling of demand sensor 114, signals will be sent from the terminal 4 of each switch module so that each triac conducts power to its respective heating element group. If the fluid flow rate is less than the maximum flow rate for which the heater is designed, the thermistor 112 will be heated by the outflowing fluid until its resistance decreases sufficiently to cause the voltage at tap 152 to balance the voltage at tap 142. At this point switch module 110 will be inhibited from maintaining triac 100 in its conducting mode thereby deactivating heating element group 46 while the other groups remain activated. Assuming that the rate of fluid flow is high enough that the deactivation of one heating element group decreases the temperature of the heated fluid below the predetermined desired temperature, i.e. sufficiently to cool the thermistor and raise its resistance so that the voltage at tap 152 once more exceeds the voltage at tap 142, then the circuit function will oscillate, alternatively turning switch module 110 and controlled heating element group 46 on and off to maintain the desired fluid output temperature.

If the fluid flow rate demanded is lower than that in the previous paragraph, so that three heating element groups is sufficient to heat the fluid above a predetermined desired temperature, the resistance of thermistor 112 will decrease enough that bridge detector tap 150 will become balanced with respect to tap 142 and the heating element group 44 will be deactivated without heating element group 46 ever becoming activated. At this point the element group 44 will oscillate as described above. Lower flow rates produce corresponding oscillations of element groups 42 and 40 respectively.

If demand increases a bit due to an increased flow rate, additional heating element groups are automatically activated in succession and oscillated to achieve the desired output fluid temperature. If flow demand decreases, the reverse function occurs. Any one of the switch modules 104, 106, 108 and 110 can perform the oscillating or "hunting" control function depending upon the volumetric flow rate demanded. The thermistor 112 is designed such that its resistance varies sufficiently within a small temperature differential corresponding to the allowable fluid output temperature range (say 10°) that all switch modules oscillate within such temperature range, although at slightly different individual predetermined temperature levels.

When the hot water faucet is turned off and demand ceases, thermistor 114 immediately self heats sufficiently to actuate the "external inhibit" function of switch modules 106, 108 and 110 and thereby quickly deactivates heating element groups 42, 44 and 46 to prevent any overheating of the suddenly dormant fluid within the heater. Switch module 104 is not so inhibited because there is no connection to its "external inhibit" terminal 1. Accordingly heating element group 40 continues to be controlled by sensor 112, oscillating between on and off in an "idle" condition so as to maintain the small volume of water inside the heater at the desired temperature in preparation for the next demand. It will be recognized that sensor 112 can also cause deactivation down to the "idle" condition in the event of sensor 114 failure, although not as quickly and therefore with some risk of overheating. Accordingly a primary purpose of flow sensor 114 and its related amplifier 500 is to deactivate the three heating element groups rapidly upon the termination of demand and thereby avoid such risk.

Other types of sensors and power controllers responsive to the degree of demand or rate of fluid flow may conceivably be utilized in place of sensor 112 and its related circitry and are within the scope of this invention, for example an upstream-downstream pressure differential sensor which applies heating power in proportion to the volumetric flow rate or a magnetic field and transducer system such as that described previously. The effective resistance of each of the heating element groups 40, 42, 44 and 46 may be equal or unequal as desired to give step power increments best suited for temperature control in the particular application. Likewise the respective resistances 120, 122, 124 and 126 can be equal or unequal for optimum control.

The advantages of the preferred control circuit of FIG. 14 include the freedom from wear of mechanical power switching relay contacts and the attendant arcing which causes radiated and conducted electromagnetic interference (EMI). The elimination of EMI is provided by the use of the switch modules which trigger the triacs to turn on at the instant the power line voltage cycle passes through zero volts. Since the triacs automatically turn off at the end of each voltage half cycle unless a further trigger pulse is supplied, there is no generation of steep interference voltage wave forms for either power turn-on or turn-off. The thermistors 112 and 114, together with the aforementioned unique construction of the heating elements, provides the extremely fast demand response necessary for accurate control of output water temperature in a system of this type which features a very small storage capacity because of the objective to heat the water on a continuous-flow basis.

To make the heater 16 completely safe for household applications, a number of safety features are provided to prevent against overheating and/or explosion. Among these are a pressure sensitive relief valve 154 which communicates between the interior and exterior of the pressure vessel 18 permitting escape of fluid if the pressure within the vessel exceeds a predetermined limit. The cap 24 acts as a condenser and shield for any hot fluid which may be emitted from the valve 154 so as to prevent injury to persons nearby.

A special feature within each switch module automatically places the triacs in their non-conducting mode if the demand sensor 112 is either short-circuited or open-circuited. With reference to FIG. 16, the feature is embodied in a circuit consisting of diodes 215 and 216 and transistor 217. Transistor 219 is on during an ouput pulse from terminal 4 so that the junction of diodes 215 and 213 is 3 diode drops (approximately 2 volts) above terminal 7. As long as the voltage at terminals 13, 14 is more positive or only 0.15 volts negative with respect to that point, diode 215 does not conduct and the circuit operates normally. If the voltage at terminal 14 drops to 1 volt or less (due to short-circuiting of the thermistor 112), the anode of diode 213 can have a potential of only 1.6 to 1.7 volts, and current does not flow through diodes 213 and 214 and transistor 219. Accordingly the controlled triac turns off. The actual threshold is approximately 1.2 volts at room temperature. If the resistance of thermistor 112 increases due to open-circuiting, the voltage at terminal 14 rises toward the supply voltage. At a voltage of approximately 6 volts, the diode 215 breaks down and turns on transistor 217, which then turns off transistor 219 and the triac.

By way of further safety features, triac failure in the closed mode keeps the power shut off. Failure of a heating element breaks the circuit and shuts that particular element off. Finally, in the event the system fails in any way that cannot be anticipated, a thermostat 156 of the standard type interposed in the main power line and completely independent of the control system reacts to overtemperature and interrupts the power supply until repairs can be made.

Figure 18:
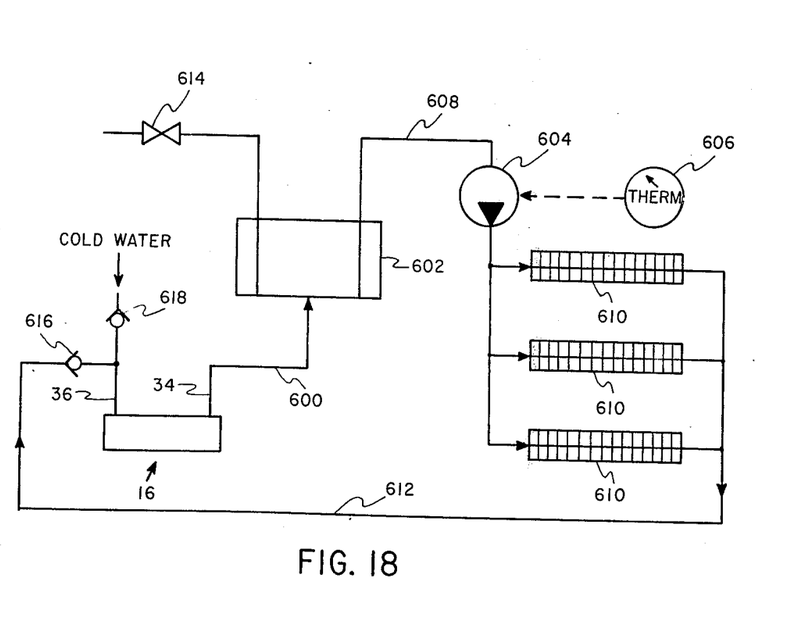
FIG. 18 is a schematic diagram showing the incorporation of the miniature continuous-flow electric fluid heater in an exemplary space-heating system.

FIG. 18 shows schematically the incorporation of the continuous-flow fluid heater of the present invention, designated generally as 16, in a space-heating system suitable for home or commercial buildings. Cold water under pressure enters the heater 16 through inlet pipe 36 and hot water emerges at outlet 34 which is preferably connected by line 600 to a closed, pressurized reservoir 602. A pump 604 is automatically controlled in a conventional manner by a room thermostat 606 so as to draw hot water from reservoir 602 through line 608 and deliver it to a plurality of convection and/or radiant space-heating units 610 in response to room temperature. The heating units 610 are preferably of the base-board type positioned in the usual locations and may comprise a hot water conduit surrounded by a plurality of projecting fins or any other suitable type of fluid space-heating unit.

When room temperature is less than the predetermined setting of thermostat 606, pump 604 is automatically actuated to deliver hot water to the units 610. When room temperature reaches or exceeds the predetermined thermostat setting, the thermostat causes the pump 604 to be slowed or deactivated as the case may be, thereby decreasing or interrupting the flow of hot water to the units 610. Water is returned from the units 610 through a common line 612 for recirculation back through the fluid heater 16. A check valve 616 interposed in the return line 612 prevents cold water under pressure from back-flowing into the heating units 610, and a second check valve 618 prevents water under pump pressure in line 612 from flowing into the cold water line. If desired the hot water system in the home or building, represented schematically by faucet 614, may also be connected to the reservoir 602 or, alternatively, such hot water system may be served by separate fluid heaters of the type described.

In operation, the fluid heater 16 of FIG. 18 functions in exactly the same manner as when it is connected solely to a hot water faucet such as 614. When no flow is demanded because the pump 604 is deactivated by the thermostat and there is no other hot water demand, the heater 16 assumes the "idle" operating condition. When the thermostat 606 activates the pump 604 in response to a demand for room heating, the heater 16 reacts by turning on sufficient heating element groups to deliver the particular volumetric flow of water at the predetermined desired temperature. Increases or decreases in volumetric demand are compensated for automatically by activation or deactivation of heating element groups in the manner previously described. Differences in energy demand caused by the temperature of the water being recycled through line 612 are also automatically compensated for by the various thermistor controls, so that water is always delivered at the predetermined desired temperature. The size and flow capacity of the fluid heater 16 corresponds to the expected maximum volumetric demand expected to be placed upon the heater, which in turn is a function of the size of the space-heating system and the size of the auxiliary hot water system 614 (if any) served by the system.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of instantaneously heating a liquid comprising:
    a. providing a fluid-holding vessel having at least one electrical heating element therewithin, each of said heating elements comprising an electrical resistance element having a fluid-impervious, electrically non-conductive vitreous ceramic coating bonded to the outer surface thereof, said coating having a thickness which is less than the thickness of said resistance element and is within the range of about two to seven thousandths of an inch, said coating and resistance element respectively having substantially equal thermal expansion coefficients within a predetermined temperature range;
    b. introducing said liquid into said vessel so as to immerse each of said heating elements in said liquid;
    c. separating said resistance elements from contact with said liquid by means of said coating; and
    d. supplying electrical power to each of said heating elements to heat said liquid while maintaining the temperature of said heating elements within said predetermined temperature range.

2. The method of claim 1 wherein said ceramic coating is glass.

3. The method of claim 1 wherein said ceramic coating is porcelain.

4. The method of claim 1 wherein said resistance element comprises a round wire wound in the shape of a helical spring.

5. The method of claim 1 wherein said step (d) includes supplying said electrical power to each of said heating elements at a watt density substantially no greater than about 20 watts per square inch of surface area of said heating elements, and limiting the differential between the temperature of said heating element and the temperature to which said liquid is heated by said element to no more than 100° fahrenheit.

6. The method of claim 1 wherein said step (b) comprises flowing said liquid into said vessel through a liquid inlet at a varying volumetric flow rate, further including the step of simultaneously removing liquid from said vessel through a liquid outlet separate from said liquid inlet.

7. The method of claim 6, further including heating said liquid with a plurality of said heating elements, sensing the presence or absence of a volumetric flow of liquid through said vessel, interrupting the supply of electrical power to a first one of said heating elements while concurrently permitting the supply of power to a second one of said heating elements during the absence of said flow, sensing the temperature to which said liquid is heated in said vessel and variably controlling the supply of electrical power to said second heating element in response to said temperature during the absence of said flow.

8. The method of claim 1, further including heating said liquid with a plurality of said heating elements, sensing said liquid's need for heating energy by means of an electrical resistance variable in response to said need, generating by means of an electrical bridge circuit having in one branch a group of resistors in series with said variable resistance a plurality of electrical signals of different potentials from respective taps located between different pairs of said resistors, and controlling the supply of electrical power to said respective heating elements each separately in response to a different one of said signals by comparing the potential of each said signal with a common reference potential tapped from a second branch of said bridge circuit which is parallel to said first branch.

9. The method of claim 8, further including variably controlling the supply of electrical power to said heating elements by means of a plurality of solid state switches each in response to a different one of said signals, each said switch controlling a separate one of said heating elements.

10. A rapid-response liquid immersion heater comprising:

a. a liquid-holding vessel;

b. a heating element mounted within said vessel for immersion in a liquid to be heated, said heating element comprising an electrical resistance element and a fluid-impervious, electrically non-conductive vitreous ceramic coating bonded to the outer surface of said resistance element for electrically insulating the same from said liquid, said coating having a thickness which is less than the thickness of said resistance element and is within the range of about two to seven thousandths of an inch, said coating and resistance element respectively having substantially equal thermal expansion coefficients within a predetermined temperature range.

11. The heater of claim 10 wherein said ceramic coating is glass.

12. The heater of claim 10 wherein said ceramic coating is porcelain.

13. The heater of claim 10 wherein said resistance element comprises a round wire wound in the shape of a helical spring.

14. The heater of claim 10, further including electrical power control means coupled to said heating element for supplying electrical power to said heating element at a watt density substantially no greater than about 20 watts per square inch of surface area of said heating element.

15. The heater of claim 10, said vessel having a liquid inlet and outlet respectively positioned such that liquid under pressure entering said vessel through said inlet contacts said heating element before being discharged from said outlet.

16. The heater of claim 15, wherein a plurality of said heating elements are provided within said vessel, flow sensor means for sensing the presence or absence of a volumetric flow of liquid through said vessel, means responsive to said flow sensor means for automatically interrupting the supply of electrical power to a first one of said heating elements while concurrently permitting the supply of power to a second one of said heating elements during the absence of said liquid flow, temperature sensor means for sensing the temperature to which said liquid is heated in said vessel, and means responsive to said temperature sensor means for automatically variably controlling the supply of power to said second heating element in response to said temperature sensor means during the absence of said flow.

17. The heater of claim 15, further including a plurality of said heating elements within said vessel, sensor means for sensing said liquid's need for heating energy, said sensor means comprising an electrical resistance variable in response to said need, electrical bridge circuit means having in one branch a group of resistors in series with said variable resistance and respective taps located between different pairs of said resistors for generating a plurality of electrical signals of different potentials from said respective taps each corresponding to the degree of said need for heating energy, and a plurality of separate control means each responsive to a different one of said signals and each coupled to a different one of said heating elements for controlling the supply of electrical power to said respective heating elements, each said control means being connected at a common tap to a second branch of said bridge circuit which is parallel to said first branch and including means for comparing the potential of one of said signals with a reference potential from said common tap.

18. The heating elements of claim 17 wherein each of said separate control means comprises a solid state switch each automatically responsive to a different one of said signals.

19. A method of heating a fluid comprising:

a. flowing said fluid at a varying volumetric flow rate through a fluid-holding vessel having a plurality of electrical heating elements therewithin;

b. sensing the presence or absence of a volumetric flow of said fluid through said vessel;

c. preventing the activation of a first one of said heating elements in response to the absence of said fluid flow while concurrently permitting the activation of a second one of said heating elements; and d. sensing the temperature to which said fluid is heated in said vessel and variably controlling the supply of electrical power to said second heating element in response to said temperature during said absence of flow.

20. An instantaneous fluid heater comprising:

a. a fluid-holding vessel having a fluid inlet and a fluid outlet positioned such that incoming fluid under pressure flows through said vessel from said inlet to said outlet;

b. a plurality of electrical heating elements mounted within said vessel in a position for heating said fluid as it flows through said vessel;

c. flow sensor means for sensing the presence or absence of a volumetric flow of fluid through said vessel;

d. power control means responsive to said flow sensor means and coupled to said heating elements for automatically preventing the activation of a first one of said heating elements in response to the absence of said fluid flow while concurrently permitting the activation of a second one of said heating elements; and e. temperature sensor means for sensing the temperature to which said fluid is heated in said vessel, said power control means also being responsive to said temperature sensor means and including means for automatically variably controlling the supply of power to said second heating element in response to said temperature sensor during the absence of said flow.

21. An instantaneous fluid heater comprising:

a. a fluid-holding vessel having a fluid inlet and a fluid outlet positioned such that incoming fluid under pressure flows through said vessel from said inlet to said outlet;

b. a plurality of electrical heating elements mounted within said vessel in a position for heating said fluid as it flows through said vessel;

c. a plurality of solid state switches, each independently controlling the supply of electrical power to a separate one of said heating elements;

d. sensor means for sensing the need for heating energy in said fluid, said sensor means comprising an electrical resistance variable in response to said need;

e. electrical bridge circuit means having in one branch a group of resistors in series with said variable resistance and respective taps located between different pairs of said resistors coupled to said respective solid state switches, for transmitting respective electrical signals of different potentials from each of said taps simultaneously to each of said switches, each said switch being connected at a common tap to a second branch of said bridge circuit which is parallel to said first branch and including means for comparing the potential of one of said signals with a reference potential from said common tap and causing said respective switches to selectively activate or de-activate said respective heating elements in response to the comparison of said potentials.

22. The heater of claim 21 wherein said sensor means comprises a thermistor.

* * * * *

UNITED STATES PATENT AND TRADEMARK OFFICE
CERTIFICATE OF CORRECTION

PATENT NO. : 3,952,182            (Page 1 of 2)
DATED : April 20, 1976
INVENTOR(S) : Robert D. Flanders It is certified that error appears in the above-identified patent and that said Letters Patent are hereby corrected as shown below:

| | | |
|---|---|---|
| Col. 1 | Line 20 | Change "powered" to --powdered--; |
| | Line 30 | After "unsatisfactory" delete the comma (,); |
| | Line 32 | After "body" add --of--. |
| Col. 2 | Line 1 | Change "substantially" to --substantial--. |
| Col. 4 | Line 41 | Change "element" to --elements--; |
| | Line 41 | Change "consituting" to --constituting--. |
| Col. 8 | Line 57 | Change "44band" to --44b and--. |
| Col. 10 | Line 27 | Change "resepective" to --respective--; |
| | Line 41 | After "portion 90" insert the word --to--; |
| | Lines 61-62 | Change "cool direction" to --cool condition--. |

UNITED STATES PATENT AND TRADEMARK OFFICE
CERTIFICATE OF CORRECTION

PATENT NO. : 3,952,182 (Page 2 of 2)
DATED : April 20, 1976
INVENTOR(S) : Robert D. Flanders It is certified that error appears in the above-identified patent and that said Letters Patent are hereby corrected as shown below:

| | | |
|---|---|---|
| Col. 11 | Line 38 | Change "symetrical" to --symmetrical--; |
| | Line 47 | After "(FIG. 16)" delete the period (.). |
| Col. 12 | Line 31 | After "through" (second occurrence) insert the word --the--; |
| Col. 13 | Line 53 | Change "eliminted" to --eliminated--. |
| Col. 14 | Line 65 | Change "alternatively" to --alternately--. |
| Col. 15 | Line 51 | Change "circitry" to --circuitry--. |

Signed and Sealed this

Twentieth Day of July 1976

[SEAL]

Attest:

RUTH C. MASON
*Attesting Officer*

C. MARSHALL DANN
*Commissioner of Patents and Trademarks*